US011868083B2

(12) United States Patent
McDaniel et al.

(10) Patent No.: US 11,868,083 B2
(45) Date of Patent: Jan. 9, 2024

(54) CONTAINERS WITH GAS VESSEL

(71) Applicant: HEWLETT-PACKARD DEVELOPMENT COMPANY, L.P., Spring, TX (US)

(72) Inventors: Gabriel McDaniel, Boise, ID (US); Jeff Luke, Boise, ID (US); Justin Pettingill, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 829 days.

(21) Appl. No.: 16/967,013

(22) PCT Filed: Apr. 27, 2018

(86) PCT No.: PCT/US2018/029972

§ 371 (c)(1),
(2) Date: Aug. 3, 2020

(87) PCT Pub. No.: WO2019/209340

PCT Pub. Date: Oct. 31, 2019

(65) Prior Publication Data

US 2021/0048776 A1 Feb. 18, 2021

(51) Int. Cl.
*G03G 21/18* (2006.01)
*F17C 13/04* (2006.01)

(52) U.S. Cl.
CPC ........... *G03G 21/181* (2013.01); *F17C 13/04* (2013.01); *F17C 2205/0323* (2013.01); *F17C 2250/0478* (2013.01); *F17C 2250/0636* (2013.01)

(58) Field of Classification Search
CPC .................... B41J 2/175; B41J 2/17513; B41J 2002/17516; B41J 2/1752; B41J 2/17523;
(Continued)

(56) References Cited

U.S. PATENT DOCUMENTS

| | | | | |
|---|---|---|---|---|
| 3,572,591 A * | 3/1971 | Brown | B65D 83/20 | 239/337 |
| 3,658,215 A * | 4/1972 | Ewald | B65D 83/32 | 222/464.5 |

(Continued)

FOREIGN PATENT DOCUMENTS

| | | |
|---|---|---|
| EP | 2514711 | 10/2012 |
| WO | WO-2012023030 A3 | 4/2012 |

*Primary Examiner* — Lien M Ngo

(74) *Attorney, Agent, or Firm* — Foley & Lardner LLP

(57) ABSTRACT

An example of a container is disclosed. The example disclosed herein comprises an impermeable container wall, a container releasing valve, and a gas vessel. The impermeable container wall defines the boundaries of an inner volume of the container. The container releasing valve is installed in the container wall to release gas from the inner volume of the container to the outside of the container. The gas vessel is installed in the inner volume of the container. The gas vessel comprises a gas vessel wall, a pressurized vessel gas, and a gas vessel releasing system. The gas vessel wall defines the boundaries of an inner volume of the gas vessel, wherein the gas vessel wall is impermeable and allows for a pressure difference between the inner volume of the gas vessel and an outer volume of the gas vessel. A pressurized vessel gas is enclosed within the inner volume of the gas vessel. And a gas releasing system is to release a certain quantity of the vessel gas to the inner volume of the gas container.

17 Claims, 6 Drawing Sheets

(58) Field of Classification Search
CPC ................ B41J 2/17556; B41J 2/17566; B41J 2002/17586; G03G 2215/0875; G03G 21/181; F17C 13/04; F17C 2205/0323; F17C 2205/0478; F17C 2205/0636
USPC .......................... 222/1, 339, 401; 347/83–87
See application file for complete search history.

(56) References Cited

U.S. PATENT DOCUMENTS

| | | | | |
|---|---|---|---|---|
| 3,815,793 | A * | 6/1974 | Morane | B65D 83/663 222/399 |
| 3,893,596 | A * | 7/1975 | Beres | B65D 83/565 222/402.19 |
| 4,937,046 | A | 6/1990 | Andersen | |
| 5,562,235 | A * | 10/1996 | Cruysberghs | B65D 83/663 222/399 |
| 6,023,915 | A | 2/2000 | Colombo | |
| 7,488,058 | B2 * | 2/2009 | Okamoto | B41J 2/17513 347/85 |
| 8,757,439 | B2 | 6/2014 | Kambouris | |
| 8,911,068 | B2 * | 12/2014 | Jo | B41J 2/17596 347/86 |
| 2009/0229278 | A1 | 9/2009 | Biotti et al. | |
| 2013/0201262 | A1 * | 8/2013 | Iwamura | B41J 2/17559 29/890.1 |
| 2015/0307217 | A1 | 10/2015 | Fairbank et al. | |
| 2016/0177243 | A1 | 6/2016 | Koretz et al. | |
| 2016/0324010 | A1 * | 11/2016 | Fahland | C09D 11/52 |
| 2018/0037398 | A1 * | 2/2018 | Shlaferman | B65D 83/48 |

* cited by examiner

CONTAINERS WITH GAS VESSEL

CROSS REFERENCE TO RELATED APPLICATIONS

This application is a U.S. National Stage Application which claims the benefit under 35 U.S.C. § 371 of International Patent Application No. PCT/US2018/029972 filed on Apr. 27, 2018, the contents of which are incorporated herein by reference.

BACKGROUND

Structural and functional features of some products may be sensitive to certain atmospheric agents and to changes of ambient weather conditions, such as the composition of the ambient atmosphere, environment humidity, temperature, and the like. This could affect these products during shipping from one place to another when ambient atmosphere conditions change during the shipment. These products may also present structural and functional issues when they are stored for a long time before used, as the storage atmospheric conditions may not be the optimal to preserve the features of said products.

BRIEF DESCRIPTION OF THE DRAWINGS

The present application may be more fully appreciated in connection with the following detailed description taken in conjunction with the accompanying drawings, in which like reference characters refer to like parts throughout and in which.

DETAILED DESCRIPTION

Figure 1:
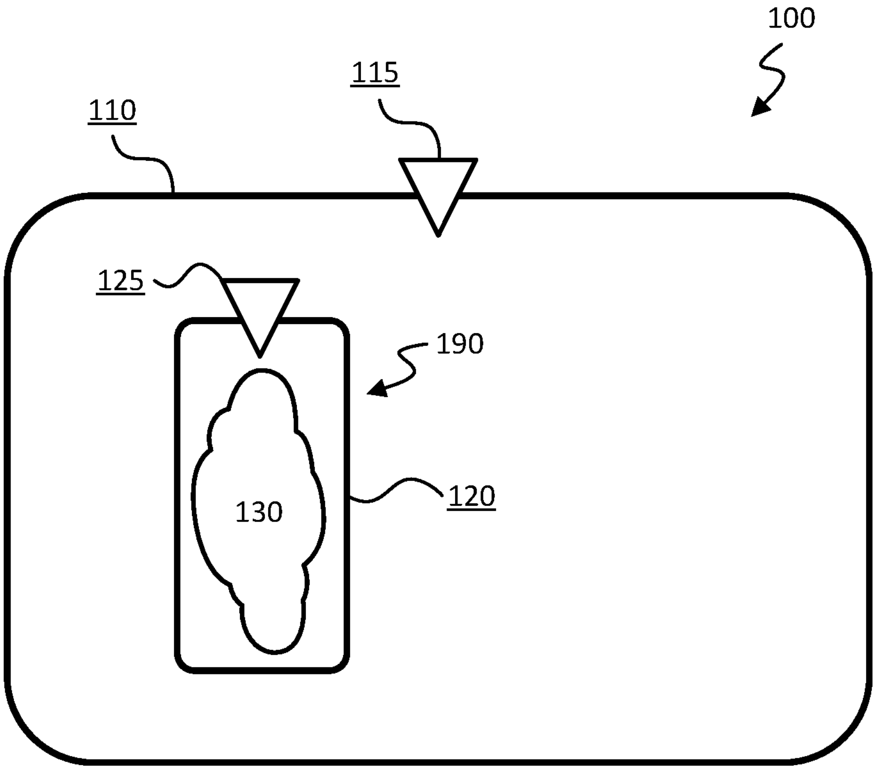
FIG. 1 is a block diagram illustrating an example of a container with a gas vessel.

The following description is directed to various examples of the disclosure. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Structural and functional features of some products may be sensitive to certain atmospheric agents (e.g., NOX, SOX, oxides, and the like) and to changes of ambient weather conditions, such as the composition of the ambient atmosphere, environment humidity, temperature, and the like. This could affect these products during shipping from one place to another when ambient atmosphere conditions change during the shipment. These products may also present structural and functional issues when they are stored for a long time before being used, as the storage atmospheric conditions may not be the optimal to preserve the features of said products.

One example of the present disclosure provides a container comprising an impermeable container wall defining the boundaries of an inner volume of the container, a container releasing valve installed in the container wall to release gas from the inner volume of the container to the outside of the container, and a gas vessel installed in the inner volume of the container. In the example, the gas vessel comprises a gas vessel wall defining the boundaries of an inner volume of the gas vessel, wherein the gas vessel wall is impermeable and allows for a pressure difference between the inner volume of the gas vessel and an outer volume of the gas vessel. The gas vessel further comprises a pressurized vessel gas enclosed within the inner volume of the gas vessel, and a gas vessel releasing system to release a certain quantity of the vessel gas to the inner volume of the gas container.

Another example of the present disclosure discloses a method of extending the shelf life of a printing component that comprises a plurality of operations to be performed. The method comprises placing the printing component inside an impermeable container comprising an impermeable container wall. The method further comprises disposing a gas vessel comprising a pressurized vessel gas inside the container wherein the gas vessel comprises a gas vessel releasing system. The method also comprises releasing a certain quantity of the vessel gas in the container and outside the vessel through the gas vessel releasing system.

Figure 2A:
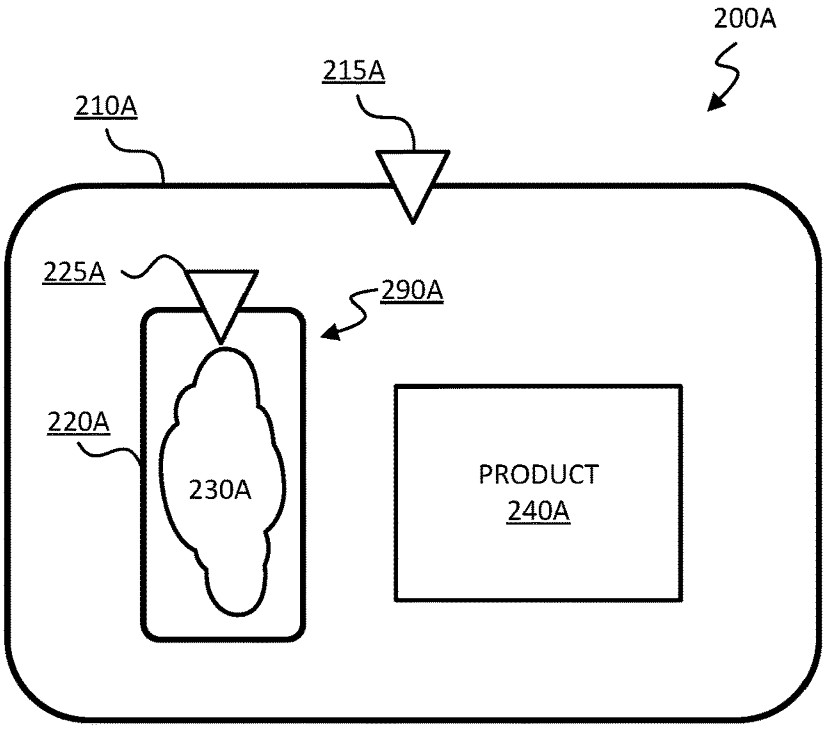
FIG. 2A is a block diagram illustrating an example of a container with a gas vessel in a configuration.
Figure 2B:
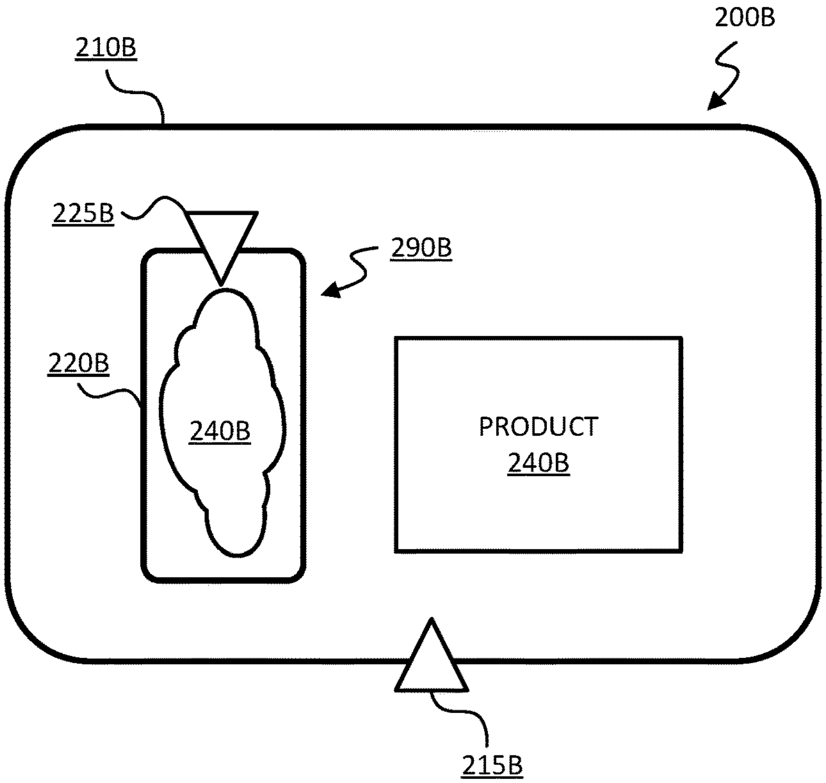
FIG. 2B is a block diagram illustrating another example of a container with a gas vessel in another configuration.

Referring now to the figures, FIG. 1 is a block diagram illustrating an example of a container 100 with a gas vessel. The container 100 comprises an impermeable container wall 110 that serves as an isolation layer between the ambient atmospheric gases outside the container wall 110 and fluids inside of the container wall 110. The term "fluid" should be interpreted as comprising liquid, vapor, and/or gas. The impermeable container wall 110 defines the boundaries of an inner volume of the container 100. In an example, the impermeable container wall 110 may include a polymer such as at least one of Acrylonitrille Butadiene Styrene (ABS), Polyvinyl Chloride (PVC), Chlorinated Polyvinyl Chloride (CPVC), and/or any other polymer having similar characteristics. In another example the impermeable container wall 110 may include a metal such as aluminum, stained steel, or a metalized film layer with different water vapor transition rates (e.g., aluminum foil laminates, Mylar). In another example, the impermeable container wall 110 may include a glass and/or composites, such as, fiber glass. The container 100 also comprises a container releasing valve 115 installed in the container wall. FIGS. 2A, and 2B comprise different examples of the container releasing valve 115 in the container wall 110. The container releasing valve 115 is a device that is to release gas from the inner volume of the container to the outside of the container. The container releasing valve 115 may also be to regulate, direct, and control the outflow in the gas from the inner volume of the container 100 to the outside of the container 100 by opening, closing, or partially obstructing various passageways therein. The container releasing valve 115 may be a valve that allows fluid flow in one direction inhibiting the fluid flow in the opposite direction, for example, a one-way valve, a check valve (CV), a clack valve, a non-return valve (NRV), a reflux valve, or a retention valve. In an example, the container releasing valve 115 may be designed to allow for a substantially zero pressure difference between the gas comprised in the inner volume of the impermeable container wall 110 and the external ambient atmospheric air.

In this disclosure, the term "impermeable" refers to a respective wall (e.g., the impermeable container wall 110) being adapted to inhibit exchange of fluids through the wall. Throughout the disclosure, the term "impermeable" should be understood as "substantially impermeable" therefore allowing a degree of flexibility. In an example, the impermeability of the respective walls inhibits up to a 98% exchange of fluid through the wall. In another example, the impermeability of the respective walls inhibits up to a 90% exchange of fluid through the wall. In yet another example, the impermeability of the respective walls inhibits up to a 75% exchange of fluid through the wall. In yet another example, the impermeability of the respective walls inhibits up to a 50% exchange of fluid through the wall. A plurality of impermeability examples have been disclosed, however a different impermeability value between the examples may also apply to the walls of the present disclosure.

The container 100 may comprise a gas vessel 190 in its inner volume. The gas vessel 190 comprises a gas vessel wall 120 that serves as an isolation layer between the fluids within the gas vessel wall 120 and the fluids within the impermeable container wall 110 but outside the gas vessel wall 120. The gas vessel wall 120 can have similar properties as the container wall 110, for example, in terms of impermeability. The gas vessel wall 120 defines the boundaries of an inner volume of the gas vessel 190. In an example, the gas vessel wall 120 may be made from a polymer such as ABS, PVC, CPVC, and the like. In another example the gas vessel wall 110 may be made from a metal such as aluminum, stained steel, or a metalized film layer. In another example, the gas vessel wall 110 may be made from a glass and/or composites, such as, fiber glass. The gas vessel wall 120 is impermeable to allow for maintenance of a pressure difference between the inner volume of the gas vessel 190 and outer volume of the gas vessel 190. The gas vessel 190 comprises a pressurized vessel gas 130 enclosed within the inner volume of the gas vessel wall 120. The gas vessel wall 120 may be designed to hold higher pressures in its inner volume than the impermeable container wall 110. In an example, the pressurized vessel gas 130 may be lighter than air; such as Helium, Nitrogen, and/or Neon. In other examples, the pressurized vessel gas 130 may be heavier than the air; such as Sulfur Hexafluoride, Argon, Krypton, and/or Xenon. In the present disclosure, gases comparative terms such as, "a gas heavier than another gas" or "a gas lighter than another gas" may be understood as said gases being measured under the Standard Temperature and Pressure (STP); for example, air under the STP may weight 1.225 kilograms per cubic meter (kg/m^3). Following the previous, a gas heavier than air would weight substantially more than 1.225 kg/m^3 under the STP temperature and pressure conditions; and a gas lighter than air would weight substantially less than 1.225 kg/m^3 under the STP temperature and pressure conditions. In some examples, the term "heavier" may equate to "denser"; and the term "lighter" may equate to "less dense than".

As used herein, the term "substantially" is used to provide flexibility to a numerical range endpoint by providing that a given value may be, for example, an additional 15% more or an additional 15% less than the endpoints of the range. The degree of flexibility of this term can be dictated by the particular variable and would be within the knowledge of those skilled in the art to determine based on experience and the associated description herein.

The gas vessel 190 comprises a gas vessel releasing system 125 to release a certain quantity of the vessel gas 130 to the inner volume of the impermeable container wall 110 but outside the volume of the gas vessel wall 120. In some examples, the gas vessel releasing system 125 may comprise a pressure valve. In an example, the gas vessel releasing system 125 may comprise an activation mechanism such as a pin (not shown) to activate the release of a substantially continuous amount of vessel gas 130 until substantially all the vessel gas 130 originally in the gas vessel wall 120 is transferred to the inner volume of the impermeable container wall 110 but outside the gas vessel wall 120. This is an example of a gas vessel releasing system 125, and many other examples can be derived therefrom, for example examples disclosed in FIG. 3 and FIG. 4.

When the gas vessel 190 is not in use, the ambient atmosphere in the inner volume of the impermeable container wall 110 but outside the gas vessel wall 120 may be substantially the same ambient atmosphere as the external atmosphere from the container 100. The ambient atmosphere external to the container 100 may be referred hereinafter as "external air". When the gas vessel releasing system 125 is activated, it may release vessel gas to the inner volume of the impermeable container wall 110 but outside the gas vessel wall 120. The vessel gas may push the external air from the container to the outside of the container through the container releasing valve 115. When substantially all the external air is transferred outside of the impermeable container wall 110, the container 100 may have an atmosphere comprised of vessel gas 130 substantially free of external air.

An example of a container 100 has been disclosed and many additional examples may be derived therefrom (e.g., using a plurality of gas vessels 190), FIG. 2A-2B illustrate examples of containers with gas a vessel in different configurations. FIG. 2A is a block diagram illustrating an example of a container 200A with a gas vessel 290A in a configuration. The container 200A may be the same or similar as the container 100 from FIG. 1. The container 200A may comprise an impermeable container wall 210A that serves as an isolation layer between the ambient atmospheric gases from outside the container wall 210A and the fluids inside of the container wall 210A. The impermeable container wall 210A defines the boundaries of an inner volume of the container 200A. The container 200A also comprises a container releasing valve 215A installed in the top part of the container wall. The container releasing valve 215A is a device that is to release gas from the inner volume of the container to the outside of the container. The container releasing valve 215A may also be to regulate, direct, and control the flow in the gas from the inner volume of the container to the outside of the container by opening, closing, or partially obstructing various passageways therein. The impermeable container wall 210A, and the container releasing valve 215A may be the same or similar as the impermeable container wall 110, and the container releasing valve 115 from FIG. 1.

The container 200A may comprise a gas vessel 290A in its inner volume. The gas vessel 290A comprises a gas vessel wall 220A that serves as an isolation layer between the fluids within the gas vessel wall 220A and the fluids within the impermeable container wall 210A but outside the gas vessel wall 220A. The gas vessel wall 220A defines the boundaries of an inner volume of the gas vessel 290A. The gas vessel wall 220A may be the same or similar as the gas vessel wall 120 from FIG. 1. The gas vessel wall 220A is impermeable and allows for a pressure difference between the inner volume of the gas vessel 290A and outer volume of the gas vessel 290A. The gas vessel 290A comprises a pressurized vessel gas 230A enclosed within the inner volume of the gas vessel wall 220A. The gas vessel wall 220A may be designed to hold higher pressures in its inner volume than the impermeable container wall 210A. In the example, the pressurized vessel gas 230A is heavier than the external gas (e.g., Sulfur Hexafluoride, Argon, Krypton, Xenon; if the external gas is air).

The gas vessel 290A comprises a gas vessel releasing system 225A to release a certain quantity of the vessel gas 230A to the inner volume of the impermeable container wall 210A but outside the volume of the gas vessel wall 220A. The gas vessel releasing system 225A may be the same as or similar to the gas vessel releasing system 125 from FIG. 1.

In the example, when the gas vessel 290A is not in use, the ambient atmosphere in the inner volume of the impermeable container wall 210A but outside the gas vessel wall 220A may be substantially the same as the external air. When the gas vessel releasing system 225A is activated, it releases vessel gas to the inner volume of the impermeable container wall 210A but outside the gas vessel wall 220A. Since the vessel gas 230A is heavier than the external air, the vessel gas places in the lower layers of the inner volume of the impermeable container wall 210A. When there is enough vessel gas 230A in the inner volume of the impermeable container wall 210A, and considering that the container releasing valve 215A is installed at the top part of the impermeable container wall 210A, the vessel gas 230A may push up the external air in the container to the outside of the container through the container releasing valve 215A. When substantially all the external air is transferred outside of the impermeable container wall 210A, the container 200A may have an atmosphere comprised of vessel gas 230A substantially free of external air.

The container 200A may comprise a product 240A within the inner volume of the impermeable container wall 210A but outside the gas vessel wall 220A. The vessel gas 230A in the gas vessel wall 220A may be selected based on the product 240A. The atmosphere of vessel gas 230A created inside the impermeable container wall 210A may provide appropriate environment conditions for the structural and functional needs of the features of the product 240A.

In an example, the product 240A may be a printing component, such as a printing composition (e.g., pigments, inks, and the like), additive manufacturing build material (e.g., PA12 build material commercially known as V1R10A "HP PA 12" available from HP Inc., and the like), additive manufacturing fusing agent (e.g., fusing agent formulations commercially known as V1Q60Q "HP fusing agent" available from HP Inc., and the like), a composition comprising UV light absorber enhancers (e.g., inks commercially known as CE039A, CE042A available from HP Inc., and the like), a toner composition for printing, parts of a printer, and the like; or a combination thereof. These are examples of product 240A, however any product may be placed within the boundaries of the inner volume of the container 200A without departing from the scope of the present disclosure. In some examples, the printing components may comprise a packaging protecting said products (e.g., the packaging protecting the cartridge of a composition comprising a colorant).

FIG. 2B is a block diagram illustrating an example of a container 200B with a gas vessel 290B in a configuration. The container 200B may be the same or similar as the container 100 from FIG. 1. The container 200B may comprise an impermeable container wall 210B that serves as an isolation layer between the ambient atmospheric gases from outside the container wall 210B and the fluids inside of the container wall 210B. The impermeable container wall 210B defines the boundaries of an inner volume of the container 200B. The container 200B also comprises a container releasing valve 215B installed in the bottom part of the container wall. The container releasing valve 215B is a device that is to release gas from the inner volume of the container to the outside of the container. The container releasing valve 215B may also be to regulate, direct, and control the flow in the gas from the inner volume of the container to the outside of the container by opening, closing, or partially obstructing various passageways therein. The impermeable container wall 210B, and the container releasing valve 215B may be the same or similar as the impermeable container wall 110, and the container releasing valve 115 from FIG. 1.

The container 200B may comprise a gas vessel 290B in its inner volume. The gas vessel 290B comprises a gas vessel wall 220B that serves as an isolation layer between the fluids within the gas vessel wall 220B and the fluids within the impermeable container wall 210B but outside the gas vessel wall 220B. The gas vessel wall 224B defines the boundaries of an inner volume of the gas vessel 290B. The gas vessel wall 220B may be the same as or similar to the gas vessel wall 120 from FIG. 1. The gas vessel wall 224B is impermeable and allows for a pressure difference between the inner volume of the gas vessel 290B and outer volume of the gas vessel 290B. The gas vessel 294B comprises a pressurized vessel gas 230B enclosed within the inner volume of the gas vessel wall 220B. The gas vessel wall 220B may be designed to hold higher pressures in its inner volume than the impermeable container wall 210B. In the example, the pressurized vessel gas 230B is lighter than the external gas (e.g., Helium, Nitrogen, Neon; if the external gas is air).

The gas vessel 294B comprises a gas vessel releasing system 225B to release a certain quantity of the vessel gas 234B to the inner volume of the impermeable container wall 210B but outside the volume of the gas vessel wall 220B. The gas vessel releasing system 225B may be the same as or similar to the gas vessel releasing system 125 from FIG. 1.

In the example, when the gas vessel 290B is not in use, the ambient atmosphere in the inner volume of the impermeable container wall 210B but outside the gas vessel wall 220B may be substantially the same as the external air. When the gas vessel releasing system 225B is activated, it releases vessel gas to the inner volume of the impermeable container wall 210B but outside the gas vessel wall 220B. Since the vessel gas 230B is lighter than the external air, the vessel gas places in the higher layers of the inner volume of the impermeable container wall 210B. When there is enough vessel gas 230B in the inner volume of the impermeable container wall 210B, and considering that the container releasing valve 215B is installed at the bottom part of the impermeable container wall 210B, the vessel gas 230B may push down the external air in the container to the outside of the container through the container releasing valve 215B. When substantially all the external air is transferred outside of the impermeable container wall 210B, the container 200B may have an atmosphere comprised of vessel gas 230B substantially free of external air.

The container 200B may comprise a product 240B within the inner volume of the impermeable container wall 210B but outside the gas vessel wall 220B. The vessel gas 230B in the gas vessel wall 220B may be selected based on the product 240B. The atmosphere of vessel gas 230B created inside the impermeable container wall 210B may provide appropriate environment conditions for the structural and functional needs of the features of the product 240B.

In an example, the product 240B may be a printing component, such as a printing composition (e.g., pigments, inks, and the like), additive manufacturing build material (e.g., PA12 build material commercially known as V1R10A "HP PA 12" available from HP Inc., and the like), additive manufacturing fusing agent (e.g., fusing agent formulations commercially known as V1Q60Q "HP fusing agent" available from HP Inc., and the like), a composition comprising UV light absorber enhancers (e.g., inks commercially known as CE039A, CE042A available from HP Inc., and the like), a toner composition for printing, parts of a printer, and the like; or a combination thereof. These are examples of product 240B, however any product may be placed within the boundaries of the inner volume of the container 200B without departing from the scope of the present disclosure. In some examples, the printing components may comprise a packaging protecting said products (e.g., the packaging protecting the cartridge of a composition comprising a colorant).

Figure 3:
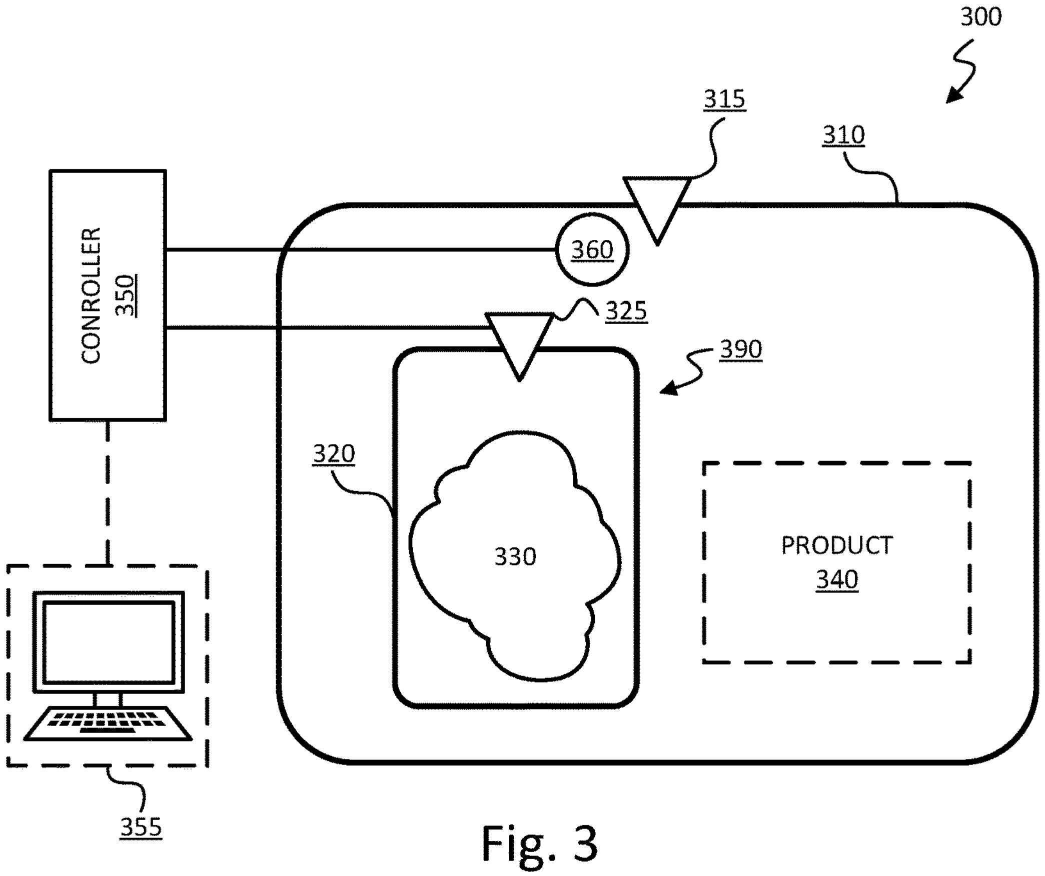
FIG. 3 is a block diagram illustrating an example of a container with a gas vessel with a container sensor.

FIG. 3 is a block diagram illustrating an example of a container 300 with a gas vessel 390 with a container sensor. The container 300 may be the same or similar as the container 100 from FIG. 1. The container 300 may comprise an impermeable container wall 310, and a container releasing valve 315. The impermeable container wall 310, and the container releasing valve 315 may be similar and have a similar functionality as the impermeable container wall 110, and the container releasing valve 115 from FIG. 1. The container 300 may comprise a gas vessel 390 in its inner volume. The gas vessel 390 comprises a gas vessel wall 320 that has a pressurized vessel gas 330 therein, and a gas vessel releasing system 325. The gas vessel 390, the gas vessel wall 320, the pressurized vessel gas 330, and the gas vessel releasing system 325 may be similar and have a similar functionality as the gas vessel 190, the gas vessel wall 120, the pressurized vessel gas 130, and the gas vessel releasing system 125 from FIG. 1. In some examples, the vessel releasing system 325 is a vessel releasing valve configurable by a controller, wherein the vessel releasing valve is to release the vessel gas 330 to the outside of the gas vessel 320 and the inside of the container wall 310.

The container 300 also comprises a container sensor 360 in the container to measure a parameter of the inner volume of the container gas. In an example, the container sensor 360 may be installed on the inner wall of the impermeable container wall 310 but in the vicinity of the container releasing valve 315. This is an example, and other possible placements may be applied without departing from the scope of the present disclosure. The container sensor 360 may measure a parameter that, for example, indicates the presence of vessel gas 330 in the inner volume container ambient gas. In an example, the container sensor 360 may measure the proportion of vessel gas in the inner volume of the impermeable container wall 310. In another example, the container sensor 360 may measure the temperature of the gas surrounding it. In yet another example, the container sensor 360 may measure the pressure of the gas surrounding it. A plurality of examples of parameters to indicate the presence of vessel gas 330 in the inner volume container ambient have been disclosed, however other parameters may be used without departing from the scope of the present disclosure.

The container 300 further comprises a controller 350 in connection with the vessel releasing valve 325 and the container sensor 360. The controller 350 connection may be by means of a physical wire and/or wireless. The term "controller" as used herein may include a series of instructions encoded on a machine-readable storage medium and executable by a single processor or a plurality of processors. Additionally, or alternatively, a controller may include one or more hardware devices including electronic circuitry, for example a digital and/or analog application-specific integrated circuit (ASIC), for implementing the functionality described herein.

The controller 350 is to instruct the container sensor 360 to measure the parameter of the inner volume of the container ambient. The parameter may indicate the presence of vessel gas 330 in the inner volume of the impermeable container wall 310. The controller 350 is further to receive the measured parameter of the inner volume of the container ambient.

The controller 350 is also to determine whether the measured parameter meets a predetermined parameter threshold. In an example, the predetermined parameter threshold is 98% of presence of vessel gas 330 in the inner volume of the impermeable container wall 310. In another example, the predetermined parameter threshold is 95% of presence of vessel gas 330 in the inner volume of the impermeable container wall 310. In yet another example, the predetermined parameter threshold is 90% of presence of vessel gas 330 in the inner volume of the impermeable container wall 310. In yet another example, the predetermined parameter threshold is 80% of presence of vessel gas 330 in the inner volume of the impermeable container wall 310. In yet another example, the predetermined parameter threshold is 65% of presence of vessel gas 330 in the inner volume of the impermeable container wall 310. These are examples of predetermined parameter thresholds and other thresholds may be encoded to the controller 350 without departing from the scope of the present disclosure.

In the event the measured parameter does not meet the predetermined parameter threshold, the controller 350 may instruct the gas vessel releasing system 325 (e.g., vessel releasing valve) to release a certain quantity of the vessel gas 330 to the inner volume of the impermeable container wall 310.

The controller 350 may be coupled to a user interface 355. The connection between the controller 350 and the user interface 355 may be by means of a physical wire and/or wireless. The user interface 355 may be part of a personal computer, tablet, smartphone, or any other electronic device comprising an interface enabling communication between the controller 350 and a user. The user interface 355 may enable the user to check the measured parameter by the container sensor 360, modify the predetermined parameter threshold, run statistics of the vessel gas 330 behavior using data available in the controller 350, and the like. This is a list of a plurality of operations enabled to the user by means of the user interface 355, however other possible operations may be encoded in the user interface 355 without departing from the scope of the present disclosure.

In some examples, the container 300 may also comprise a product 340 within the inner volume of the impermeable container wall 310 but outside the gas vessel wall 320. The vessel gas 330 in the gas vessel wall 320 may be selected based on the product 340. The atmosphere of vessel gas 330 created inside the impermeable container wall 310 may provide appropriate environment conditions for the structural and functional needs of the features of the product 340. The product 340 may be the same as or similar to product 240A from FIG. 2A and/or product 240B from FIG. 2B.

Figure 4:
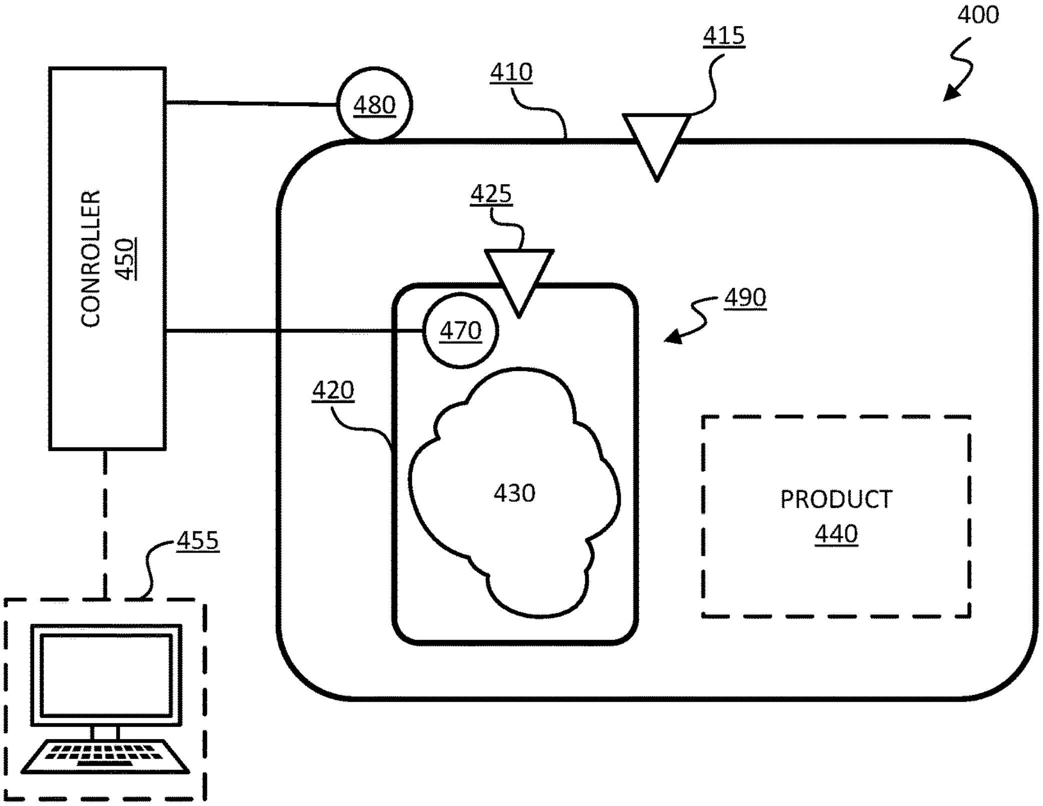
FIG. 4 is a block diagram illustrating an example of a container with a gas vessel with a vessel sensor.

FIG. 4 is a block diagram illustrating an example of a container 400 with a gas vessel 490 with a vessel sensor. The container 400 may be the same or similar as the container 100 from FIG. 1. The container 400 may comprise an impermeable container wall 410, and a container releasing valve 415. The impermeable container wall 410, and the container releasing valve 415 may be the similar and have a similar functionality as the impermeable container wall 110, and the container releasing valve 115 from FIG. 1. The container 400 may comprise a gas vessel 490 in its inner volume. The gas vessel 490 comprises a gas vessel wall 420 that has a pressurized vessel gas 430 therein, and a gas vessel releasing system 425. The gas vessel 490, the gas vessel wall 420, the pressurized vessel gas 430, and the gas vessel releasing system 425 may be similar and have a similar functionality as the gas vessel 190, the gas vessel wall 120, the pressurized vessel gas 130, and the gas vessel releasing system 125 from FIG. 1.

The container 400 also comprises a vessel sensor 470 installed in the inner volume of the gas vessel 490 to determine the presence of the vessel gas 430 within the inner volume of the gas vessel 490. In an example, the vessel sensor 470 may be installed on the inner wall of the gas vessel wall 420 but in the vicinity of the gas vessel releasing system 425 (e.g., gas vessel valve 425). This is an example, and other possible placements may be applied without departing from the scope of the present disclosure. The vessel sensor 470 may measure a parameter that indicates the presence of vessel gas 430 in the inner volume of the gas vessel 490. In an example, the vessel sensor 470 may measure the proportion of vessel gas 430 in the inner volume of the gas vessel wall 420. In another example, the vessel sensor 470 may measure the temperature of the gas surrounding it. In yet another example, the container sensor 470 may measure the pressure of the gas surrounding it. A plurality of examples of parameters to indicate the presence of vessel gas 430 in the inner volume of the gas vessel 490 have been disclosed, however other parameters may be used without departing from the scope of the present disclosure.

The container 400 may further include a user indicator 480 to announce a user that no vessel gas 430 is present in the gas vessel 490. The user indicator 480 may be placed in a visible position to the user. In an example, the user indicator 480 may be placed on the outer wall of the impermeable container wall 410. In another example, the user indicator 480 may be a light source (e.g., LED, bulb, lamp, and/or the like) to visibly announce the user of the absence, or near absence, of vessel gas 430 in the gas vessel 490. In yet another example, the user indicator 480 may be a sound source (e.g., speaker, alarm, and/or the like) to make noise to announce the user of the absence, or near absence, of vessel gas 430 in the gas vessel 490. A plurality of examples of user indicator 480 have been disclosed, however other means of announcing a user that no vessel gas 430 is present in the gas vessel 490 may be used without departing from the scope of the present disclosure.

The container 400 further comprises a controller 450 in connection with the vessel sensor 470, and the user indicator 480. The controller 480 connection to the vessel sensor 470, and the user indicator 480 may be by means of a physical wire and/or wireless. The term "controller" as used herein may include a series of instructions encoded on a machine-readable storage medium and executable by a single processor or a plurality of processors. Additionally, or alternatively, a controller may include one or more hardware devices including electronic circuitry, for example a digital and/or analog application-specific integrated circuit (ASIC), for implementing the functionality described herein.

The controller 450 is to instruct the vessel sensor 470 to determine the presence of the vessel gas 430 within the inner volume of the gas vessel 490. In an example, the vessel sensor 470 measures the percentage of vessel gas 430 present in the inner volume of the gas vessel wall 420. In an example, the vessel sensor 470 may be the same as or similar to the container sensor 360 from FIG. 3.

In the event the vessel sensor 470 determines that there is no vessel gas present in the gas vessel 490, the controller 450 is further to instruct the user indicator to announce the user that no vessel gas 430 is present in the gas vessel 490. In other examples, the controller may trigger the user indicator activation instruction if the vessel sensor 470 measures that the presence of vessel gas 430 in the inner volume of the gas vessel wall 420 meets a predetermined threshold. For example, the predetermined threshold is 2% of presence of vessel gas 430 in the inner volume of the gas vessel wall 420. In another example, the predetermined threshold is 5% of presence of vessel gas 430 in the inner volume of the gas vessel wall 420. In another example, the predetermined threshold is 10% of presence of vessel gas 430 in the inner volume of the gas vessel wall 420. In another example, the predetermined threshold is 25% of presence of vessel gas 430 in the inner volume of the gas vessel wall 420.

The controller 450 may be coupled to a user interface 455. The connection between the controller 450 and the user interface 455 may be by means of a physical wire and/or wireless. The user interface 455 may be part of a personal computer, tablet, smartphone, or any other electronic device comprising an interface enabling communication between the controller 450 and a user. The user interface 455 may enable the user to check and/or keep track of the measured parameter by the vessel sensor 470, modify the predetermined threshold, run statistics of the vessel gas 430 behavior using data available in the controller 450, modify the announcing mechanism of the user indicator 480 (e.g., sound, light pattern), and the like. This is a list of a plurality of operations enabled to the user by means of the user interface 455, however other possible operations may be encoded in the user interface 455 without departing from the scope of the present disclosure.

In some examples, the container 400 may also comprise a product 440 within the inner volume of the impermeable container wall 410 but outside the gas vessel wall 420. The vessel gas 430 in the gas vessel wall 420 may be selected based on the product 440. The atmosphere of vessel gas 430 created inside the impermeable container wall 410 may provide appropriate environment conditions for the structural and functional needs of the features of the product 440. The product 440 may be the same as or similar to product 240A from FIG. 2A and/or product 240B from FIG. 2B.

Figure 5:
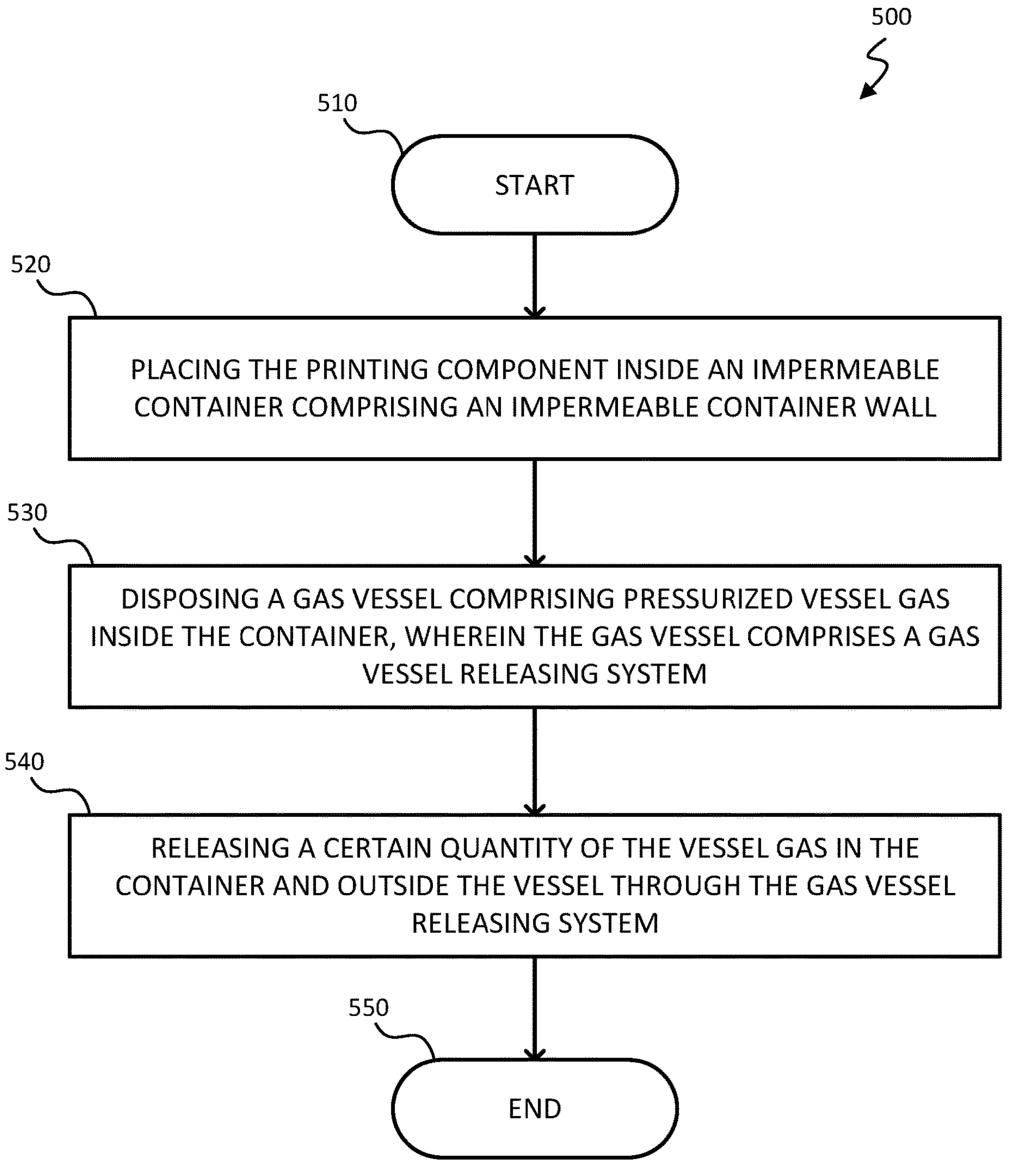
FIG. 5 is a flowchart of an example of a method of extending the shelf life of a printing component using a container with a gas vessel.

FIG. 5 is a flowchart of an example of a method of extending the shelf life of a printing component using a container with a gas vessel. Method 500 may be described below as being executed or performed by a container, such as container 100 of FIG. 1. Various other suitable systems may be used as well, such as, for example container 200A of FIG. 2A, container 200B of FIG. 2B, container 300 from FIG. 3, and/or container 400 from FIG. 4. In some implementations of the present disclosure, method 500 may include more or less blocks than are shown in FIG. 5. In some implementations, one or more of the blocks of method 500 may, at certain times, be ongoing and/or may repeat.

Method 500 may start in block 510, and continue to block 520, where a user may place the printing component inside an impermeable container (e.g., impermeable container 100 from FIG. 1) comprising an impermeable container wall (e.g., impermeable container wall 110 from FIG. 1). At block 530 the user may dispose a gas vessel (e.g., gas vessel 190 from FIG. 1) comprising pressurized vessel gas (e.g., pressurized vessel gas 130 from FIG. 1) inside the container, wherein the gas vessel comprises a gas vessel releasing system (e.g., gas vessel releasing system 125 from FIG. 1). At block 540, the gas vessel releasing system may release a certain quantity of the vessel gas in the container and outside the vessel. At block 550, the method 500 may end. Method 500 may be repeated multiple times, for example, to place multiple packaged printing components inside a single impermeable container and/or introduce multiple gas vessels to extend the shelf life of the printing components in the impermeable container. In some examples, the container may be closed and/or sealed before block 540.

The printing components may be printing compositions (e.g., pigments, inks, and the like), additive manufacturing build material (e.g., PA12 build material commercially known as V1R10A "HP PA 12" available from HP Inc., and the like), additive manufacturing fusing agent (e.g., fusing agent formulations commercially known as V1Q60Q "HP fusing agent" available from HP Inc., and the like), compositions comprising UV light absorber enhancers (e.g., inks commercially known as CE039A, CE042A available from HP Inc., and the like), toner composition for printing, parts of a printer, and/or the like. These are examples of printing components, however in the present disclosure any other product related to the printing industry may be understood as a printing component. In some examples, the printing components may comprise a packaging protecting said products (e.g., the packaging protecting the cartridge of a composition comprising a colorant).

Figure 6:
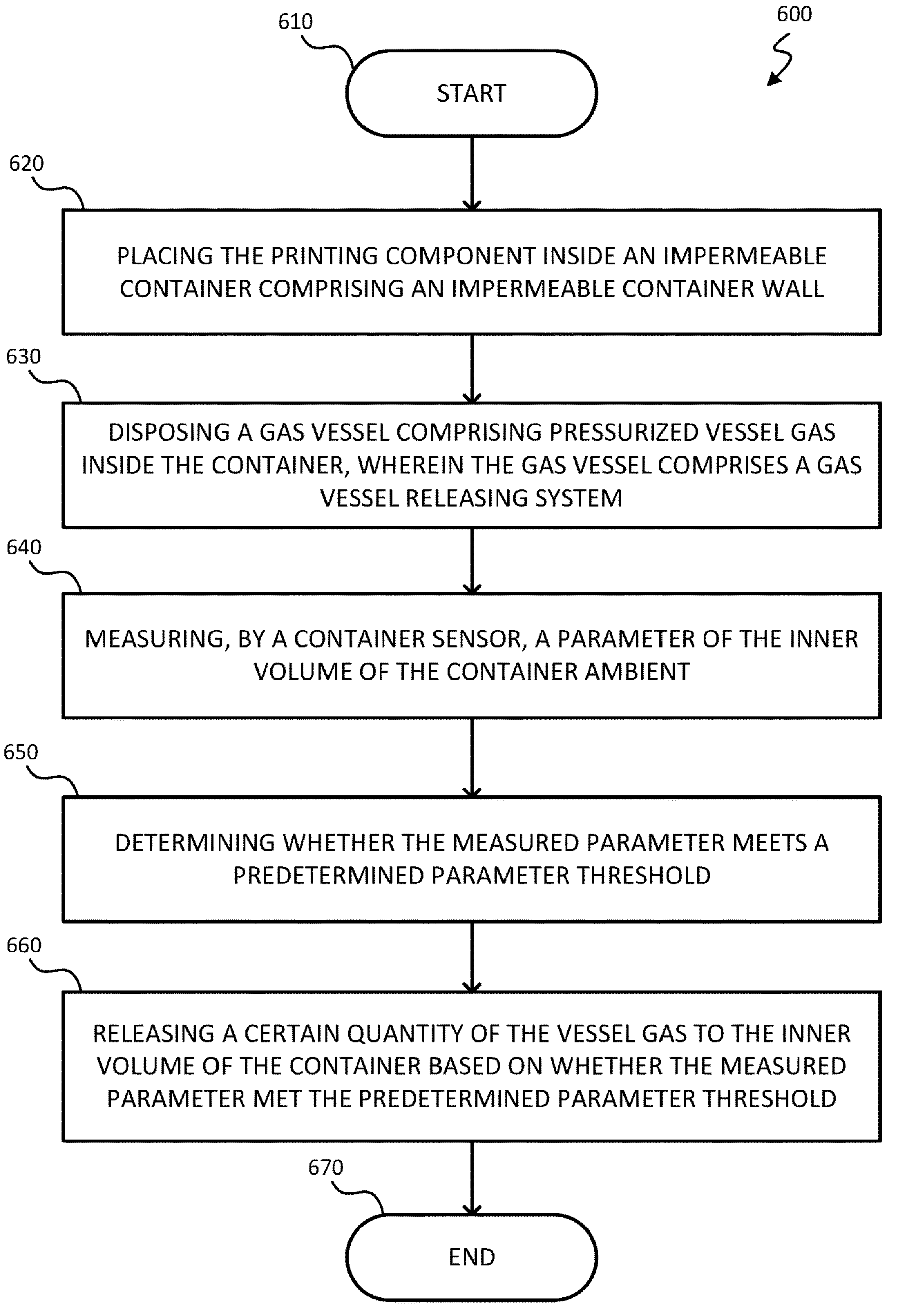
FIG. 6 is a flowchart of another example of a method of extending the shelf life of a printing component using a container with gas a vessel.

FIG. 6 is a flowchart of another example of a method 600 of extending the shelf life of a printing component using a container with a gas vessel. Method 600 may be described below as being executed or performed by a container, such as container 300 of FIG. 3. In some implementations of the present disclosure, method 600 may include more or less blocks than are shown in FIG. 6. In some implementations, one or more of the blocks of method 600 may, at certain times, be ongoing and/or may repeat. The printing component of method 600 may be the same as or similar to the printing component of method 500.

Method 600 may start in block 610, and continue to block 620, where a user may place the printing component inside an impermeable container (e.g., impermeable container 300 from FIG. 3) comprising an impermeable container wall (e.g., impermeable container wall 310 from FIG. 3). At block 630 the user may dispose a gas vessel (e.g., gas vessel 390 from FIG. 3) comprising pressurized vessel gas (e.g., pressurized vessel gas 330 from FIG. 3) inside the container, wherein the gas vessel comprises a gas vessel releasing system (e.g., gas vessel releasing system 325 from FIG. 3). In some examples, the container may be closed and/or sealed after block 630. At block 640 a container sensor (e.g., container sensor 360 from FIG. 3) may measure a parameter of the inner volume of the container ambient. The parameter to measure may be the same as or similar as the parameter to measure in FIG. 3. At block 650 a controller (e.g., controller 350 from FIG. 3) may determine whether the measured parameter meets a predetermined parameter threshold. The predetermined parameter threshold may be the same as or similar to the predetermined parameter threshold of FIG. 3. At block 660, the gas vessel releasing system may release a certain quantity of the vessel gas in the inner volume of the container based on whether the measured parameter met the predetermined parameter threshold or not. At block 670, the method 600 may end. Method 600 may be repeated multiple times, for example, to place multiple printing components inside a single impermeable container and/or introduce multiple gas vessels to extend the shelf life of the packaged printing components in the impermeable container. In an additional example, the method 600 may include a monitoring mechanism by including a monitoring routine by, for example, repeating block 640 after block 660.

Figure 7:
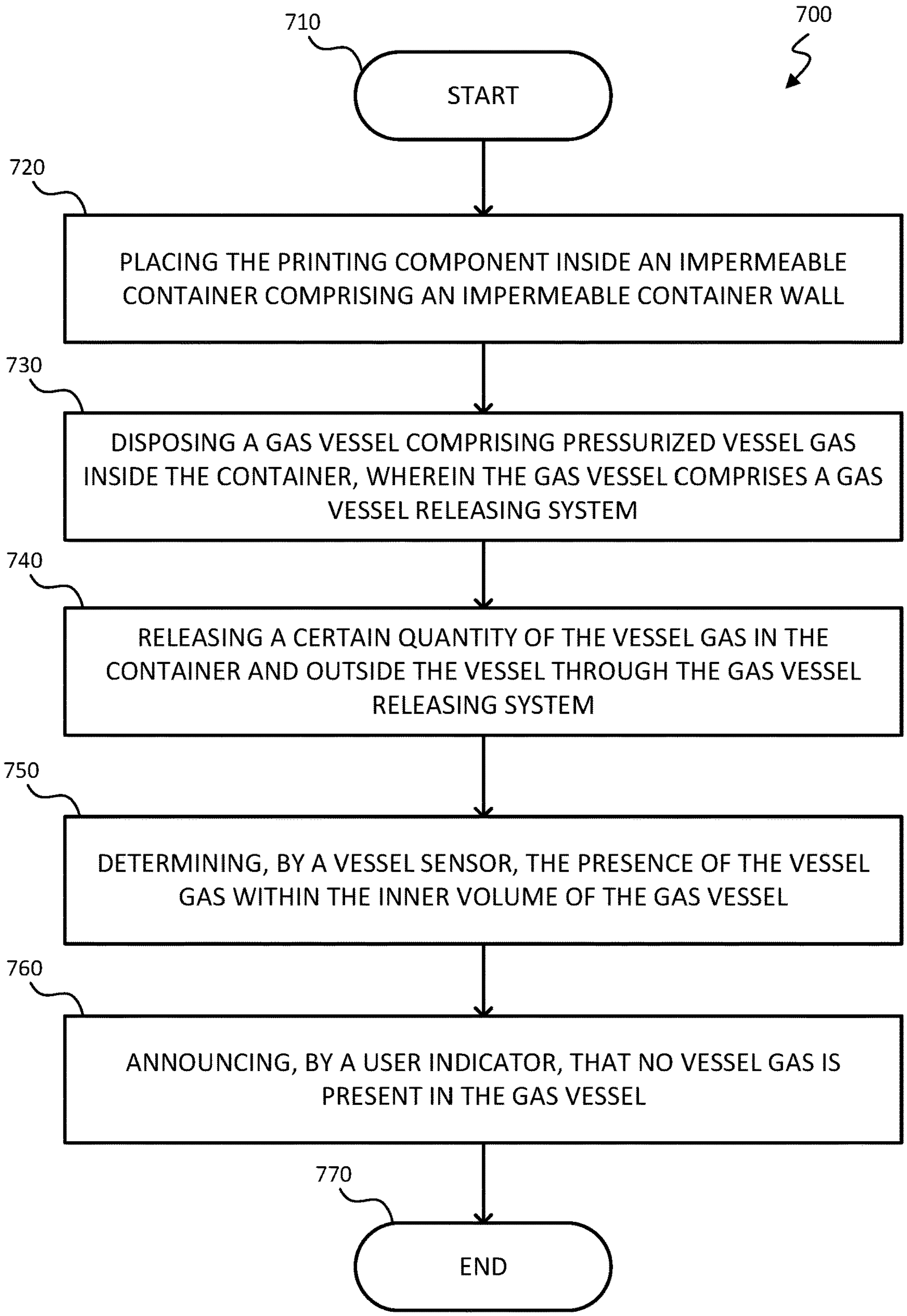
FIG. 7 is a flowchart of another example of a method of extending the shelf life of a printing component using a container with gas a vessel.

FIG. 7 is a flowchart of another example of a method 700 of extending the shelf life of a printing component using a container with a gas vessel. Method 700 may be described below as being executed or performed by a container, such as container 400 of FIG. 4. In some implementations of the present disclosure, method 700 may include more or less blocks than are shown in FIG. 7. In some implementations, one or more of the blocks of method 700 may, at certain times, be ongoing and/or may repeat. The printing component of method 700 may be the same as or similar to the printing component of method 500.

Method 700 may start in block 710, and continue to block 720, where a user may place the printing component inside an impermeable container (e.g., impermeable container 400 from FIG. 4) comprising an impermeable container wall (e.g., impermeable container wall 410 from FIG. 4). At block 730 the user may dispose a gas vessel (e.g., gas vessel 490 from FIG. 4) comprising pressurized vessel gas (e.g., pressurized vessel gas 430 from FIG. 4) inside the container, wherein the gas vessel comprises a gas vessel releasing system (e.g., gas vessel releasing system 425 from FIG. 4). In some examples, the container may be closed and/or sealed after block 730. At block 740 the gas vessel releasing system may release a certain quantity of the vessel gas in the container and outside the vessel. At block 750 a vessel sensor (e.g., vessel sensor 470 from FIG. 4) may determine the presence of the vessel gas within the inner volume of the gas vessel. At block 760 a user indicator (e.g., user indicator 480 from FIG. 4) may announce that no vessel gas is present in the gas vessel. At block 770, the method 700 may end. Method 700 may be repeated multiple times, for example, to place multiple packaged printing components inside a single impermeable container and/or introduce multiple gas vessels to extend the shelf life of the packaged printing components in the impermeable container. In an additional example, the method 700 may include a monitoring mechanism by including a monitoring routine by, for example, repeating block 740 after block 760.

The above examples may be implemented by hardware, or software in combination with hardware. For example, the various methods, processes and functional modules described herein may be implemented by a physical processor (the term processor is to be implemented broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

What it is claimed is:

1. A container comprising:

an impermeable container wall defining the boundaries of an inner volume of the container;

a container releasing valve installed in the container wall to release gas from the inner volume of the container to the outside of the container; and a gas vessel installed in the inner volume of the container, wherein the gas vessel comprises:

a gas vessel wall defining the boundaries of an inner volume of the gas vessel, wherein the gas vessel wall is impermeable and allows for a pressure difference between the inner volume of the gas vessel and an outer volume of the gas vessel;

a pressurized vessel gas enclosed within the inner volume of the gas vessel; and a gas vessel releasing system to release a certain quantity of the vessel gas to the inner volume of the container;

a vessel releasing valve to release the vessel gas to the outside of the gas vessel and to the inner volume of the container;

a container sensor in the container to measure a parameter of gas in the inner volume of the container; and a controller coupled to the vessel releasing valve and the container sensor, the controller is to:

instruct the container sensor to measure the parameter of the gas in the inner volume of the container, receive the measured parameter of the gas in the inner volume of the container, determine whether the measured parameter meets a predetermined parameter threshold, and instruct to release the certain quantity of the vessel gas to the inner volume of the container.

2. The container of claim 1, comprising a product within the boundaries of the inner volume of the container.

3. The container of claim 2, wherein the product is a printing component.

4. The container of claim 1, wherein the container releasing valve is to allow for a substantially zero pressure difference between the gas in the inner volume of the container and ambient gas outside of the container.

5. The container of claim 1, wherein the gas vessel releasing system is to release the certain quantity of the vessel gas to the inner volume of the container so that the vessel gas occupies substantially all the inner volume of the container.

6. The container of claim 1, wherein the vessel gas in the container and outside of the gas vessel is heavier than ambient gas outside of the container, the container releasing valve being installed in a top part of the container wall.

7. The container of claim 1, wherein the vessel gas in the container and outside of the gas vessel is lighter than ambient gas outside of the container, the container releasing valve being installed in a bottom part of the container wall.

8. The container of claim 1, wherein the container sensor is installed in the inner volume of the container in the vicinity of the container releasing valve.

9. The container of claim 1, wherein the measured parameter is an indicator of the presence of vessel gas in the inner volume of the container.

10. The container of claim 1, wherein the controller is wirelessly coupled to the vessel releasing valve.

11. The container of claim 1, further comprising:

a vessel sensor installed in the inner volume of the gas vessel to determine the presence of the vessel gas within the inner volume of the gas vessel; and a user indicator to announce to a user that no vessel gas is present in the gas vessel;

wherein the controller is coupled to the vessel sensor and the user indicator, the controller is to:

instruct the vessel sensor to determine the presence of the vessel gas within the inner volume of the gas vessel, and instruct the user indicator to announce the user that no vessel gas is present in the gas vessel when the sensor determines that there is no vessel gas present in the gas vessel.

12. A method of extending the shelf life of a printing component, the method comprising:

placing the printing component inside an impermeable container comprising an impermeable container wall;

disposing a gas vessel comprising pressurized vessel gas inside the container, wherein the gas vessel comprises a gas vessel releasing system;

releasing a certain quantity of the vessel gas into an inner volume of the container and outside the gas vessel through the gas vessel releasing system;

measuring, by a container sensor, a parameter of a gas in the inner volume of the container;

determining whether the measured parameter meets a predetermined parameter threshold; and releasing the certain quantity of the vessel gas to the inner volume of the container based on whether the measured parameter met the predetermined parameter threshold.

13. The method of claim 12, wherein the printing component comprises a packaging.

14. The method of claim 12, wherein the certain quantity of the vessel gas occupies substantially all of the inner volume of the container.

15. The method of claim 12 further comprising:

determining, by a vessel sensor, the presence of the vessel gas within the inner volume of the gas vessel; and announcing, by a user indicator, that no vessel gas is present in the gas vessel.

16. A container comprising:

an impermeable container wall defining the boundaries of an inner volume of the container;

a container releasing valve installed in the container wall to release gas from the inner volume of the container to the outside of the container;

a gas vessel installed in the inner volume of the container, wherein the gas vessel comprises:

a gas vessel wall defining the boundaries of an inner volume of the gas vessel, wherein the gas vessel wall is impermeable and allows for a pressure difference between the inner volume of the gas vessel and an outer volume of the gas vessel;

a pressurized vessel gas enclosed within the inner volume of the gas vessel; and a gas vessel releasing system to release a certain quantity of the vessel gas to the inner volume of the container;

a vessel sensor installed in the inner volume of the gas vessel to determine the presence of the vessel gas within the inner volume of the gas vessel;

a user indicator to announce a user that no vessel gas is present in the gas vessel; and a controller coupled to the vessel sensor and the user indicator, the controller is to:

instruct the vessel sensor to determine the presence of the vessel gas within the inner volume of the gas vessel, and instruct the user indicator to announce the user that no vessel gas is present in the gas vessel when the sensor determines that there is no vessel gas present in the gas vessel.

17. A method of extending the shelf life of a printing component, the method comprising:

placing the printing component inside an impermeable container comprising an impermeable container wall;

disposing a gas vessel comprising pressurized vessel gas inside the container, wherein the gas vessel comprises a gas vessel releasing system;

releasing a certain quantity of the vessel gas into an inner volume of the container and outside the gas vessel through the gas vessel releasing system;

determining, by a vessel sensor, the presence of the vessel gas within the inner volume of the gas vessel; and announcing, by a user indicator, that no vessel gas is present in the gas vessel.

* * * * *